US008910216B2

(12) United States Patent
Overbaugh et al.

(10) Patent No.: US 8,910,216 B2
(45) Date of Patent: Dec. 9, 2014

(54) SYSTEMS AND METHODS FOR SETTING A TIMER VIA AN INTERACTIVE TRIGGER

(75) Inventors: Daniel Overbaugh, Aurora, CO (US); Casey Paiz, Denver, CO (US); Taun Crum, Parker, CO (US); Timothy Heckathorn, Larkspur, CO (US); Kate Megan Carney Landow, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 685 days.

(21) Appl. No.: 12/613,779

(22) Filed: Nov. 6, 2009

(65) Prior Publication Data

US 2010/0115545 A1 May 6, 2010

Related U.S. Application Data

(60) Provisional application No. 61/112,137, filed on Nov. 6, 2008.

(51) Int. Cl.
| | |
|---|---|
| G06F 3/00 | (2006.01) |
| G06F 13/00 | (2006.01) |
| H04N 7/025 | (2006.01) |
| H04N 21/435 | (2011.01) |
| H04N 5/782 | (2006.01) |
| H04N 21/433 | (2011.01) |
| H04N 21/472 | (2011.01) |
| H04N 21/235 | (2011.01) |
| H04N 21/488 | (2011.01) |
| H04N 7/088 | (2006.01) |

(52) U.S. Cl.
CPC ............ *H04N 21/435* (2013.01); *H04N 5/782* (2013.01); *H04N 21/4334* (2013.01); *H04N 21/47214* (2013.01); *H04N 7/088* (2013.01); *H04N 21/235* (2013.01); *H04N 21/4882* (2013.01)
USPC ............................................. 725/58; 725/60

(58) Field of Classification Search
USPC ................................................. 725/58, 60, 61
See application file for complete search history.

(56) References Cited

U.S. PATENT DOCUMENTS

| | | | |
|---|---|---|---|
| 5,748,733 A | 5/1998 | Quan | |
| 6,532,589 B1 * | 3/2003 | Proehl et al. .................... | 725/40 |

(Continued)

FOREIGN PATENT DOCUMENTS

| | | |
|---|---|---|
| CN | 1810031 A | 7/2006 |
| EP | 1608177 A2 | 11/1996 |

OTHER PUBLICATIONS

International Search Report and Written Opinion dated Dec. 29, 2009, PCT/US2009/063509, 8 pages.

(Continued)

*Primary Examiner* — Scott Beliveau
*Assistant Examiner* — Patrick A Ryan
(74) *Attorney, Agent, or Firm* — Ingrassia Fisher & Lorenz, P.C.

(57) ABSTRACT

Systems and methods may provide for setting a timer via an interactive trigger. The interactive trigger may be combined with a video stream and detected when the video stream is to be displayed. Based on the detection, a selectable display object associated with the interactive trigger may be displayed with the display of the video stream. Selection of the selectable display object may enable a timer to be set based on the interactive trigger. The timer enabled by the interactive trigger may be a recording timer, an auto-tune timer or a reminder timer.

16 Claims, 11 Drawing Sheets

(56) References Cited

U.S. PATENT DOCUMENTS

| | | | |
|---|---|---|---|
| 7,370,343 B1* | 5/2008 | Ellis | 725/58 |
| 7,730,510 B1* | 6/2010 | Wagner et al. | 725/58 |
| 2002/0174425 A1 | 11/2002 | Markel et al. | |
| 2003/0053000 A1 | 3/2003 | Testin et al. | |
| 2003/0063217 A1 | 4/2003 | Smith | |
| 2003/0126607 A1 | 7/2003 | Phillips et al. | |
| 2004/0003407 A1 | 1/2004 | Hanafee et al. | |
| 2004/0237120 A1 | 11/2004 | Lewin et al. | |
| 2005/0172318 A1 | 8/2005 | Dudkiewicz et al. | |
| 2005/0240963 A1 | 10/2005 | Preisman et al. | |
| 2006/0031914 A1* | 2/2006 | Dakss et al. | 725/135 |
| 2006/0123451 A1 | 6/2006 | Preisman | |
| 2007/0076872 A1* | 4/2007 | Juneau | 380/202 |
| 2007/0079325 A1* | 4/2007 | de Heer | 725/32 |
| 2007/0300264 A1* | 12/2007 | Turner | 725/60 |
| 2008/0015932 A1* | 1/2008 | Haeuser et al. | 705/14 |
| 2009/0193460 A1* | 7/2009 | Barnett | 725/38 |

OTHER PUBLICATIONS

European Patent Office, "European Search Report" mailed Mar. 30, 2012; International Appln. No. PCT/US2009/063509.

China State Intellectual Property Office "First Office Action" dated Jan. 11, 2013 for China Patent Appln. No. 200980143161.

Canadian Intellectual Property Office "Office Action" mailed Sep. 20, 2012 for Canadian Patent Appln. No. 2,740,592.

Intellectual Property Office "Office Action" dated Dec. 22, 2012 for Taiwan Patent Appln. No. 098137812.

European Patent Office, Examination Report, dated Jul. 5, 2011 for European Patent Application No. 09 825 457.6.

* cited by examiner

SYSTEMS AND METHODS FOR SETTING A TIMER VIA AN INTERACTIVE TRIGGER

RELATED APPLICATIONS

This application claims priority to U.S. Provisional Patent Application No. 61/112,137, which was filed on Nov. 6, 2008 and titled "Systems and Methods for Setting Timers Via an Interactive Trigger", which is incorporated by reference herein as if fully reproduced below.

TECHNICAL FIELD

The inventive field relates generally to providing enhanced television services, such as via cable television, satellite television, broadcast television or other distribution system. In particular, the inventive field relates to interactive features provided with television programming.

BACKGROUND DISCUSSION

The proliferation of subscription television programming, the increasing number of available channels, and the corresponding increase in television programming have led to continued development of various features and capabilities of client devices and broadcast services. For example, the interactivity of onscreen program directories and guides has been significantly increased over the years. Further, other user interactive features, such as the ability to set timers to record programs, the ability to set user preferences, for example, for how information is displayed, and the ability to lock or otherwise control access to channels has been developed.

Recent developments include the expansion of such features to include remote task scheduling via the Internet. Such approaches typically allow a subscriber of television services to interact with their client device remotely via a website that provides various functions to permit the subscriber to instruct their client device to perform certain activities, such as setting a timer to record a program or initiating recording based on an instruction scheduled through the website. In general, such approaches aim to allow the subscriber to perform various functions remotely that are conventionally performed by the subscriber directly using the client device.

Many conventional client devices are configured to receive programs and program information from one or more sources, generally referred to as the service provider or broadcast service. The programs and the program information may be provided to the client device via one or more communication channels. For example, in a cable broadcast system, the programs and the program information may be provided to the client device via a coaxial cable connected to an input of the client device. In a satellite broadcast system, the programs and the program information may be provided to the client device via a satellite dish that is connected to an input of the client device via a coaxial cable.

In general, client devices may buffer the data received from the service provider or broadcast service. This allows the client device to time shift a program being displayed, for example, to pause, rewind, etc. This buffering may also facilitate recording of a program, by allowing a user to record a program that has already been partially displayed prior to the decision to record.

SUMMARY

Many conventional client devices are only configured to record future programs by manually setting timers through user input mechanisms such as an electronic program guide and/or a program search menu. In either case, a user must navigate the guide or menu to identify a program to be recorded.

Systems and methods for providing enhanced television services as described herein may facilitate the setting of timers, for various purposes, so that a user need not navigate a guide or menu as conventionally required. Further, systems and methods described herein may facilitate the promotion of viewing and/or recording of programs.

Some embodiments may provide a method for providing enhanced television services. Such embodiments may involve adding or inserting an interactive trigger to/into a video steam of a program. A client device may receive the video stream of the program and either provide the video stream to an associated television display device for viewing or record the program so that the video stream may be provided to the associated television display device for later viewing. When the video stream of the program is displayed for viewing, a selectable display object, such as an icon and/or text, may also be displayed. When the selectable display object is selected by a user, the interactive trigger may enable the user to set a timer based on the interactive trigger or may automatically set a timer based on the interactive trigger.

In some embodiments, user selection of the interactive trigger may cause a timer creation screen to be displayed. Depending on the type of timer to be set, the timer creation screen may include various timer parameters to be set for execution of the timer. For example, a recording timer may include timer parameters that identify the program to be recorded, the service (e.g., channel, network) of the program, the name of the program, the date of the program, the start time of the program and the end time of the program. The timer parameters may be set to particular values based on the interactive trigger. As appropriate or desired, such values may be default values that may be modified by the user. For example, the user may wish to begin recording early and/or end recording later than the exact program start/end times. Other parameters, such as the frequency of recording, may also be set based on the interactive trigger, and may also be modified by the user.

Some embodiments may provide a client device for providing enhanced television services. Such embodiments may involve a client device that is configured to detect an interactive trigger in a video steam of a program. The client device may be configured to detect the interactive trigger when the video stream of the program is provided to an associated television display device. In embodiments, the video stream may be provided live, delayed or from a recording. Based on the interactive trigger detected, the client device may cause a selectable display object to be displayed with the program. The client device may be configured to receive user input indicating selection of the selectable display object. Upon receipt of such user input, the client device may enable the user to set a timer based on the interactive trigger or may automatically set a timer based on the interactive trigger.

By using various embodiments, setting timers for programs may be facilitated. Additionally, targeted promotion of programs may be enhanced using various embodiments.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

Figure 1:
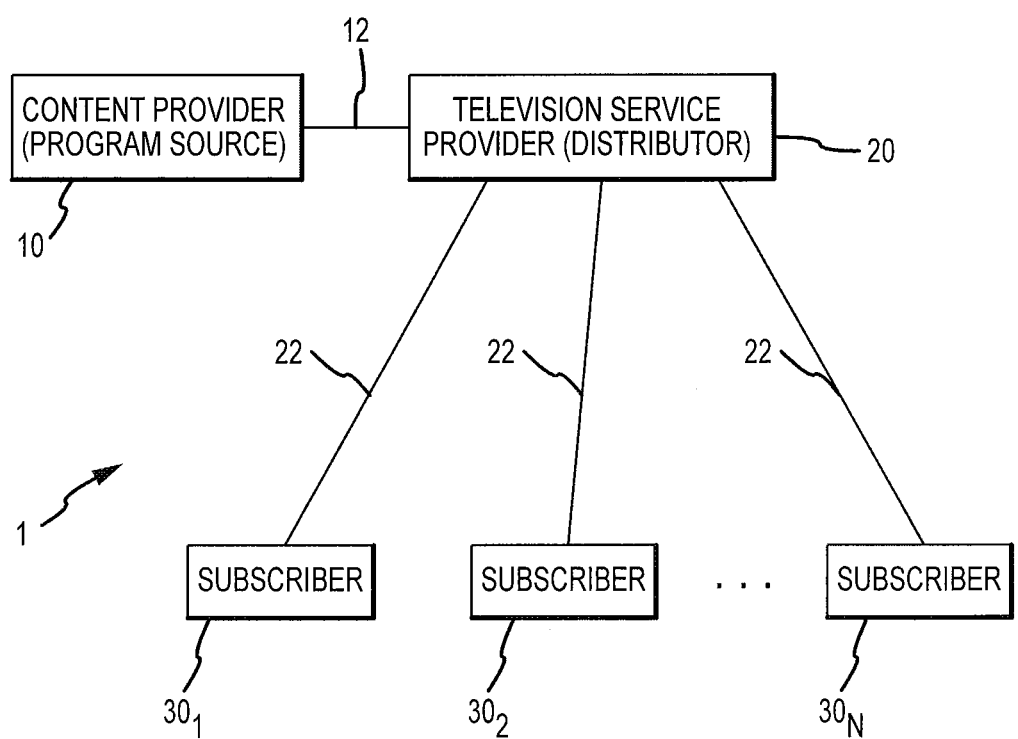
FIG. 1 is a block diagram illustrating components of an example of a broadcast satellite television system.

As used herein, the term "client device" is intended to encompass a device that is configured to receive programs and/or program information from a broadcast source (e.g., satellite, cable, Internet, etc.) and to facilitate display the programs and/or the program information on a display device, such as a television or a monitor. Although not restricted to a particular implementation, the term "client device" is intended to encompass set top boxes, satellite receivers, digital video recorders, and the like. The client devices described herein may be embodied in software and/or hardware that facilitate the reception and display of programs and/or program information from a broadcast source of any suitable type (e.g., satellite, Internet protocol, wireless, etc.).

The embodiments shown in the Figures illustrate systems and methods that may allow the setting of a timer based on an interactive trigger in a video stream being displayed. The timer may be of various types, including a recording timer configured to record a program, an auto-tune timer configured to tune the client device to a particular channel (e.g., service or network) at a set time so as to display a particular program on that channel at that time, or a reminder timer configured to provide an audio and/or visual indication in advance that a particular program is to be on a particular channel at a particular time. The timer may also be set to be recurring, for example, to apply to all episodes of a series, to only new episodes of a series, only once, weekly, daily, to only weekdays, or the like. The illustrated systems and methods provide examples of how such timers may be implemented via interactive triggers. However, it should be understood that other variations are possible and contemplated.

Facilitating the setting of timers may be desirable for many reasons. For example, a user's experiences may be improved by making it easier to set timers for programs that may be of interest to the user. The program(s) of the interactive trigger(s) described herein may be related in some way to a program the user is viewing, such as having a common theme, actor(s), or the like, such that the user is likely to have interest in setting a timer for the program of the trigger.

Alternatively or additionally, the interactive triggers described herein may be used to promote programs to users to increase viewership. Instead of relying only on an advertisement and the user's memory of the advertisement to watch and/or to set a timer, an interactive trigger may be included in the advertisement to make it easy for the user to set a timer, whether to record, auto-tune or remind. Embodiments of the interactive triggers described herein may allow such promotion for programs provided on the channel being viewed as well as for programs provided on other channels (cross-channel promotion).

It should be understood that the following embodiments illustrate various details in a simplified manner and do not include all variants, extensions or modifications that are contemplated. The implementation of the interactive triggers described herein is not limited to a particular broadcast technology, such as, satellite, cable or internet, and may be applied to other broadcasting technologies as well. Similarly, the implementation of the interactive triggers is not limited to a particular encoding format or display resolution, such as standard definition (SD), high definition (HD), 3-D, digital or analog, mpeg-2, mpeg-4.

Figure 2:
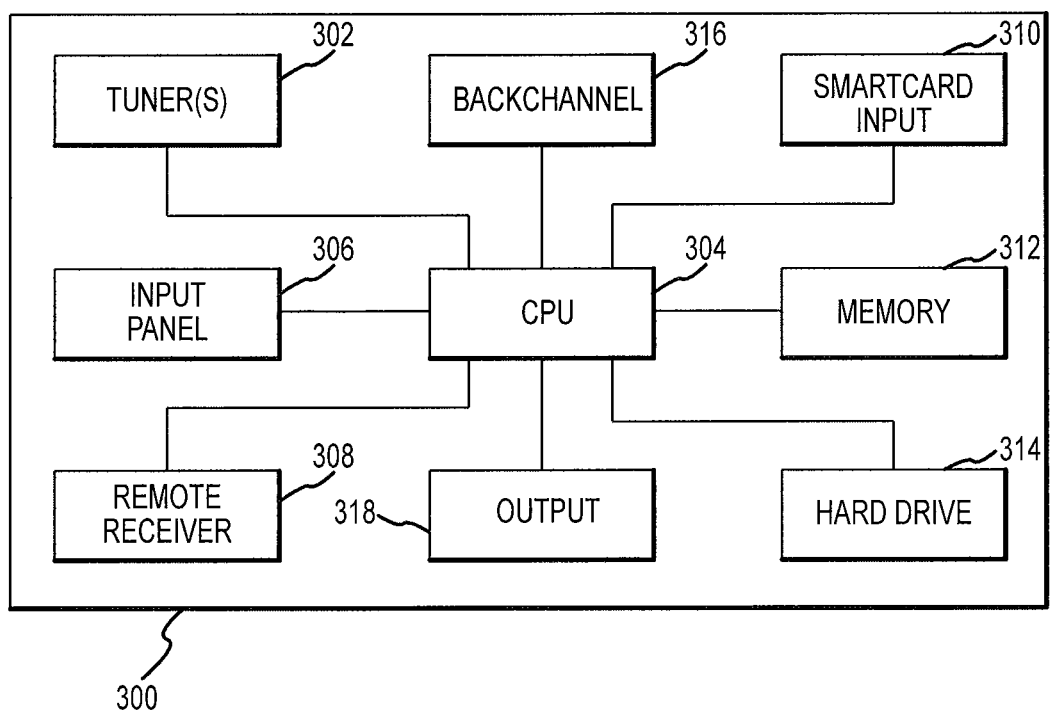
FIG. 2 is a block diagram illustrating an example of client-device.

The block diagrams shown in FIGS. 1 and 2 and the flowcharts shown in FIGS. 3-7 are for illustration only and are not intended to represent the only possible process flows and system configurations. In particular, it should be understood that operations may be added, omitted and reordered as may be suitable to a particular application. Also, individual components may be added, omitted, replaced and interrelated as may be suitable to a particular application. All details appurtenant to implementing the exemplary systems and methods that are well understood in the art are omitted for simplicity and clarity.

FIG. 1 is a simplified block diagram illustrating components of an example of a broadcast television system 1 that may be used to implement various features described herein. In particular, FIG. 1 generally illustrates a television service provider or distributor 20 that may provide content, such as programs, advertisements and programming information, to a plurality of subscribers $30_1, 30_2 \ldots 30_N$ over communication links 22. The service provider may be, for example, a cable television company, a satellite television company, or the like. The subscribers $30_1, 30_2 \ldots 30_N$ may be households, businesses or any other entities that subscribe to television services. The communication links 22 may be wired, such as coaxial cable or the like, or wireless, such as a satellite link to a subscriber's receiving dish.

In any suitable manner known in the art, the service provider 20 may receive content, such as programs, advertisements and the like, from a content provider 10 via a communication link 12. Again, the communication link 12 may be any suitable mechanism, including wired and/or wireless technologies, as appropriate or desired, capable of communicating the data from the content provider 10 to the service provider 20. Details of the content provider 10 and the service provider 20 are well known in the art and are omitted for the sake of clarity and brevity. In particular, implementation of operations described herein that may be performed at the content provider 10 and/or the service provider 20 will be readily apparent to those skilled in the art based on this disclosure.

Various implementations are possible for providing interactive triggers in the broadcast television system 1 shown in FIG. 1. In particular, in some embodiments, the service provider 20 may add or insert interactive triggers to/into a video stream of the content that is provided to the subscribers $30_1, 30_2 \ldots 30_N$. In some embodiments, the content provider 10 may add or insert interactive triggers to/into a video stream of the content that is provided to the service provider 20. In that case, the content including the interactive triggers may be passed through to the subscribers $30_1, 30_2 \ldots 30_N$. It should be understood that a combination of the foregoing is also possible, as may be appropriate or desired.

Each of the subscribers $30_1, 30_2 \ldots 30_N$ may include one or more client devices configured to receive the content from the service provider 20. FIG. 2 illustrates a high-level block diagram of an example of a client device 300. Only a high-level description is provided herein as the details of such a client device are generally known in the art. As with the broadcast television system 1 shown in FIG. 1, the client device 300 shown in FIG. 2 should not be considered to be limiting, but should be understood as providing context for the systems and methods described herein. Further, it should be understood that the client device 300 may include suitable circuitry, other hardware and/or software to allow the client device 300 to perform conventional operations as well as those described herein in connection with the interactive triggers.

In particular, the client device 300 may include one or more tuners 302 configured to tune in channels from signals received from the service provider (not shown), for example, multiplexed signals for a plurality of channels. It should be understood that the tuner(s) may be in a separate device, such as a television converter, but typically, the tuner(s) is/are included in the client device, such as a set-top-box, DVR receiver, or the like. The tuner(s) 302 may operate under control of a processor 304, such as a CPU or other suitable microprocessor or circuitry. The CPU 304 may receive user input or commands based on user input via an input panel 306 on the client device 300 and/or via a remote receiver 308 configured to receive signals from an associated remote controller (not shown). Additionally, the CPU 304 may be provided with various account information, such as authorization codes for access to particular channels (e.g., services, networks), via a smartcard input 310. The use of smartcards for activating and enabling client devices, as well as the type of information that may be provided thereby, is well known in the art.

Once the CPU 304 has accessed the information on the smartcard via the smartcard input 310, the information may be stored in a memory 312 and/or a storage device 314, such as a hard drive. Thus, the CPU 304 may or may not access the smartcard for such information when needed. As known in the art, the client device 300 may also include a backchannel 316, such as a telephone land-line and/or an IP (Internet protocol) connection, that may be used for one- or two-way communication with the client device separate from the television broadcast communication link.

As noted above, the CPU 304 may control the tuner(s) 302, for example, to selectively output video and/or audio streams, as well as other information, as appropriate or desired, such as a selectable display object as described herein. While all elements of the client device 300 are shown as being interconnected through the CPU 304, it should be understood that different connections, such as direct connections, between the other elements may be employed, as appropriate or desired.

With respect to the interactive triggers discussed herein, the client device 300 may be configured to monitor the video stream, for example, from the active tuner 302, that is, the tuner 302 currently providing the video stream for display. The client device 300 may also be configured to monitor previously recorded content, such as a recorded program stored on the hard drive 314, during playback. Further, the client device 300 may also be configured to monitor content stored in a buffer, implemented in any suitable fashion as known in the art such as the memory 312 and/or the hard drive 314, during playback. Thus, the client device 300 may be able to cause corresponding selectable display objects of the interactive triggers discussed herein to be displayed, whether viewing of the associated content is live or during playback.

In some embodiments, the CPU 304 may be configured to perform the monitoring. It should be understood, however, that a dedicated processor or other device, circuitry and/or software may be employed to perform the monitoring. Regardless of the particular implementation, the client device 300 may be configured to detect triggers in the video stream of programs.

The interactive triggers configured to cause or enable a timer to be set may include various information and/or parameters. Although it will be understood from the description provided that a single parameter may be used in some circumstances, the description herein is not limited to such an approach. Thus, it should be understood that various single parameters may be employed alone and that various combinations of parameters other than those specifically described may be employed.

For example, the interactive trigger may comprise a string of characters in the form of code. The code may include various fields for providing information such as the conditions for the trigger and/or parameters of the timer to be set by selection of the trigger. The interactive trigger may include, for example, a unique program identification (UPID), a service unique identification (SUID), a program/event name or title, and/or a timer frequency. The timer frequency may be a default value, as appropriate or desired. Further, the SUID may be implemented as a plurality of SUIDs, such as a primary SUID and a secondary SUID, for example, corresponding to alternate channels for the same program, such as high definition (HD) and standard definition (SD). In another example, the primary SUID and the secondary SUID may correspond to alternate orbital locations for the same program, such as an "eastern arc" and a "western arc" (satellite receivers oriented at different orbital slots based on a geographic location of the satellite reciever).

Various information (e.g., parameters) that defines aspects of the corresponding selectable display object of a trigger may be part of the trigger as well. For example, parameters such as duration, text, location and size may be included in the trigger, such as particular fields of the code as discussed above. Such parameters do not relate to the timer to be set based on the trigger. Rather, such parameters define how long the selectable display object is displayed, what text the display object includes, where on the screen the display object is displayed and how big the display object is as displayed, respectively. It should be understood that these parameters regarding the selectable display object are only examples, and are not exhaustive of the aspects of the display object that may be determined by such information included in the trigger.

Figure 3A:
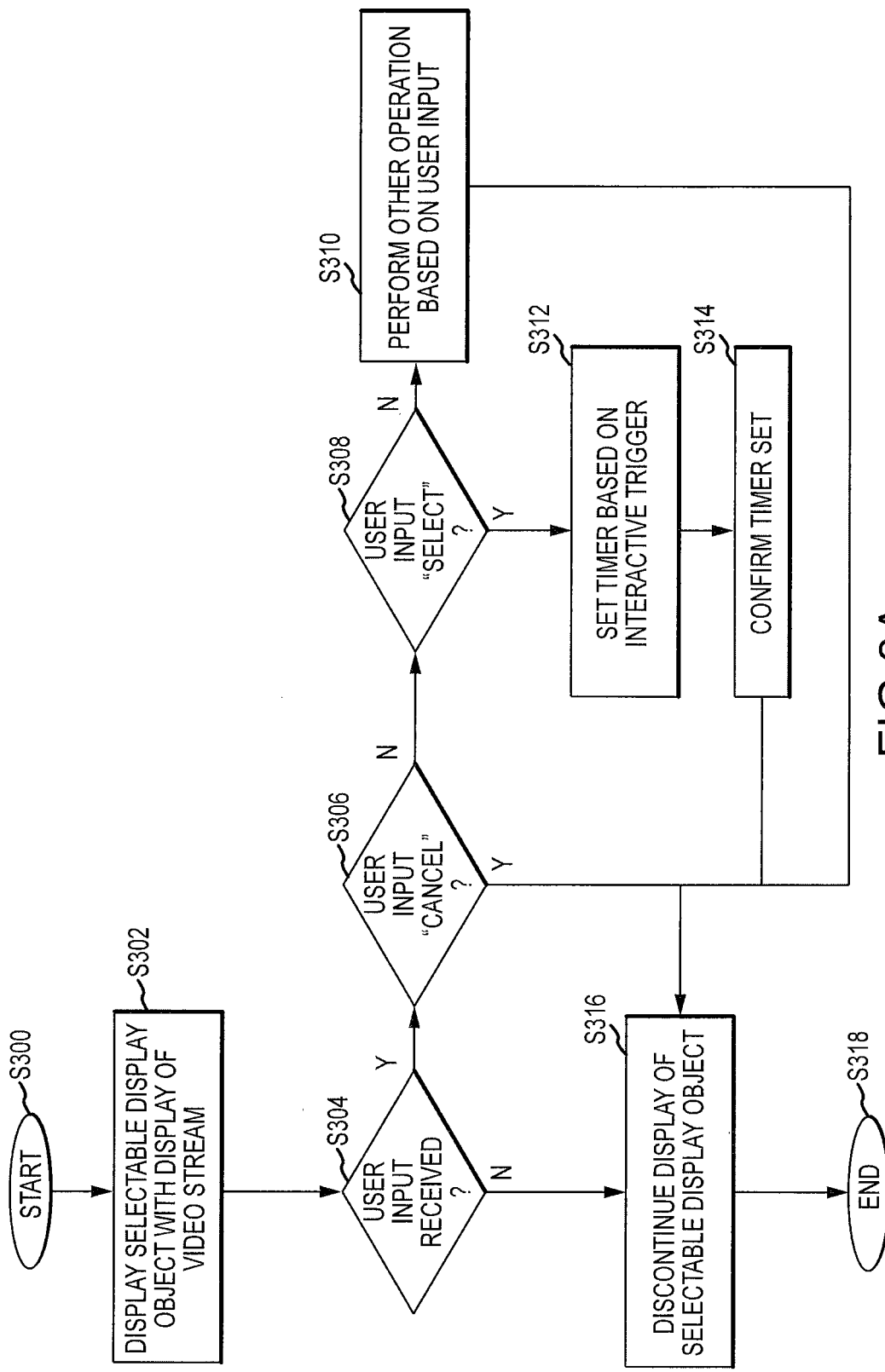
FIGS. 3A and 3B are flowcharts illustrating examples of operations that may be performed to provide enhanced television services via an interactive trigger for setting a timer.
Figure 3B:
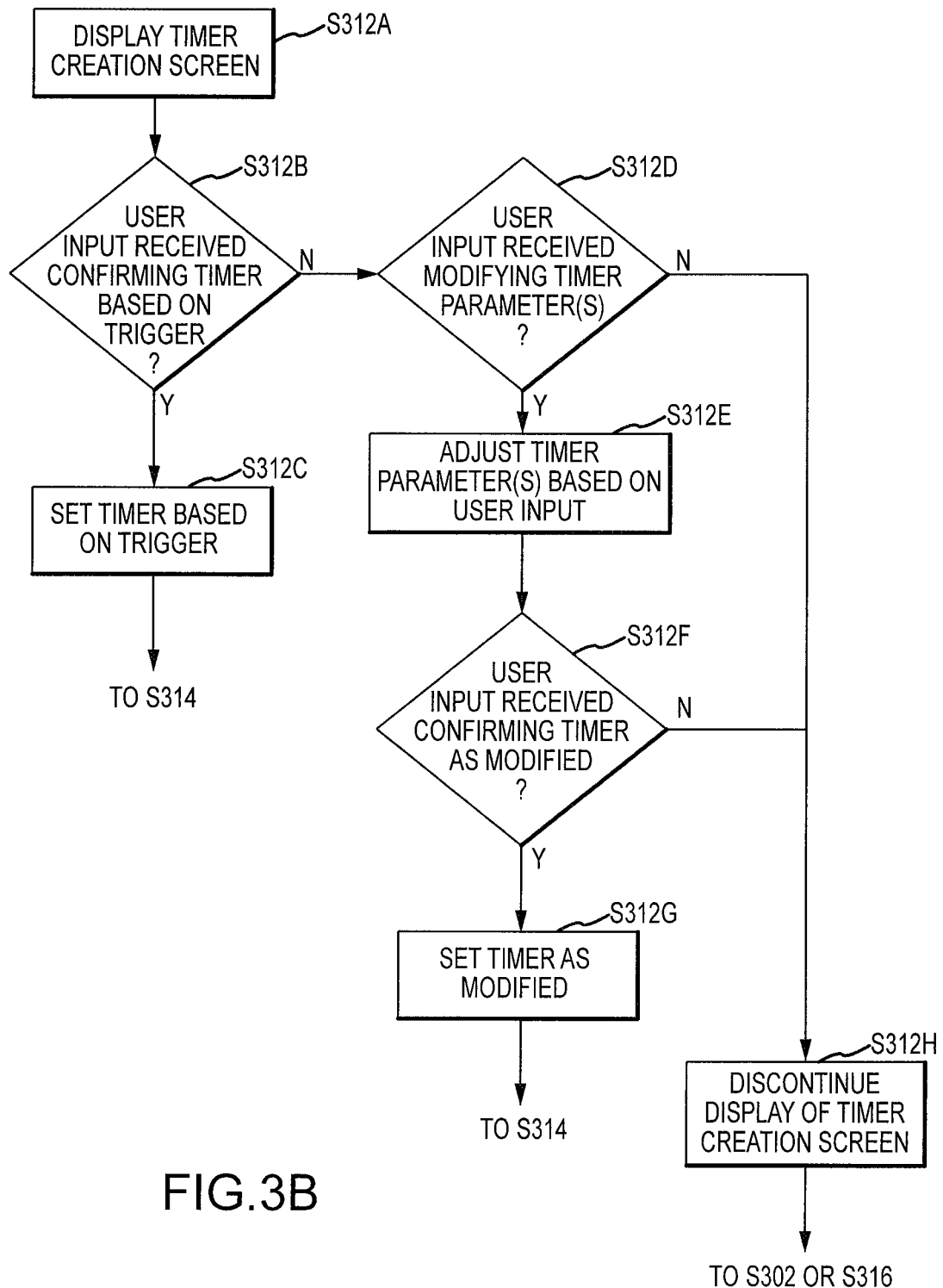

FIGS. 3A and 3B are flowcharts illustrating examples of operations that may be performed to provide enhanced television services via an interactive trigger for setting a timer. In FIG. 3A, control may begin at S300 and continue to S302, where a selectable display object may be displayed with display of a video stream of a program. As discussed herein, in addition to no interactive trigger being detected, various conditional may exist that may cause a detected trigger not to be displayed with the associated video stream. For example, one option is to not display the selectable display object when the service of the program associated with the trigger is not available and/or is not authorized.

Once the selectable display object is displayed, a timer, counter, or the like may be employed to limit the display of the selectable display object to a limited time. Thus, once the selectable display object is displayed, the client device may monitor or simply wait for a user input to the client device. Such a determination may be made at S304. If user input is not received within the limited time, control may jump to S316, where display of the selectable display object may be discontinued. Control may then proceed to S318, where the process may end.

If user input is received within the limited time, however, control may proceed to S306, where a determination may be made as to whether the received user input is a "CANCEL" command. If so, control may jump to S316, where display of the selectable display object may be discontinued. Control may then proceed to S318, where the process may end. Thus, in some embodiments, the user may be able to remove the displayed selectable display object, for example, by pressing an appropriate button.

When the received user input is not a "CANCEL" command, control may proceed to S308, where a determination may be made as to whether the received user input is a "SELECT" command. If so, control may jump to S312, where a timer may be set based on the interactive trigger. For example, the one or more parameters specified by the trigger may be used as a timer parameter. The client device may then confirm the timer has been set at S314. Such confirmation may take any suitable form, whether audio, visual or both, that indicates the timer has been successfully set. In some embodiments, the confirmation may be a display with details regarding the timer, such as the date, channel, begin and times and/or name of the program for the first or multiple instances of the timer.

Figure 4:
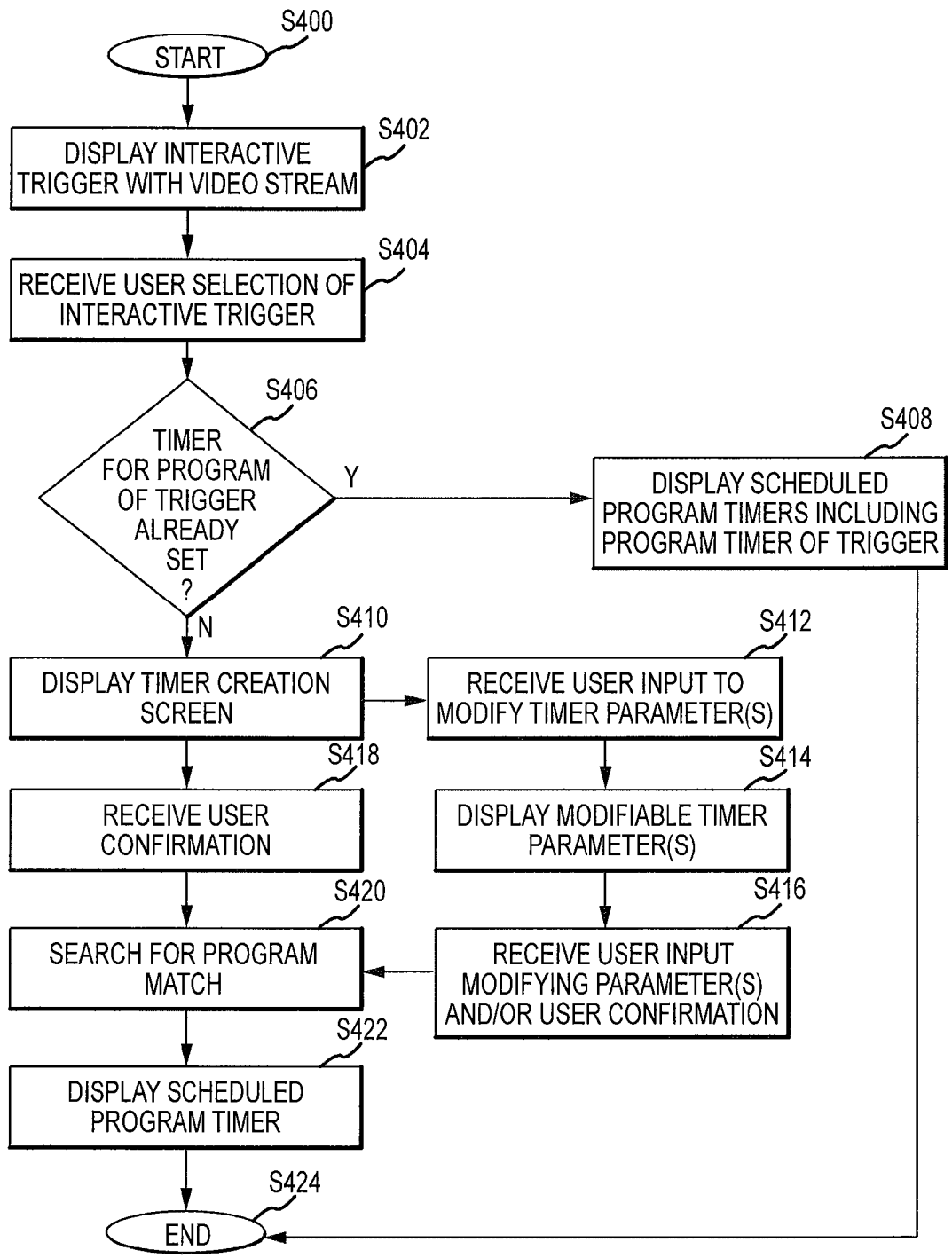
FIG. 4 is a flowchart illustrating further examples of operations that may be performed to provide enhanced television services via an interactive trigger for setting a timer.

When the user input is not a "SELECT" command, control may proceed to S310, where a different operation based on the received user input may be performed. In either case, control may proceed to S316, where display of the selectable display object may be discontinued. Control may then proceed to S318, where the process may end. FIG. 4 is a flowchart illustrating further examples of operations that may be performed to provide enhanced television services via an interactive trigger for setting a timer.

FIG. 3B shows possible alternative steps to the automatic setting of the timer at S312 in FIG. 3A. Thus, having received a "SELECT" input from the user selecting the displayed display object, control may proceed to S312A, where a timer creation screen may be displayed to the user. The timer creation screen may be of any suitable format and layout, as appropriate or desired. In embodiments, the timer creating screen is the same as is conventionally provided by the client device for setting timers. Next, at S312B, a determination may be made as to whether user input confirming the timer based on the selected trigger has been received. If so, the trigger may be set based on the trigger (parameters). Control may return to S314.

When confirmation of the timer based on the selected trigger segments is not received, a determination may be made as to whether user input modifying the timer parameter(s) has been received. If so, the timer parameter(s) may be adjusted based on the received input at S312E. Next, at S312F, a determination may be made as to whether trigger may be set based on the adjusted trigger (parameters). Then the timer with the modified parameters is set at S312G. Control may return to S314.

When either no user input modifying parameters is received at S312D or when user input confirming the timer as modified is not received at S312F, control may proceed to S312H, where display of the timer screen is discontinued. Control may then return to either S302 or S316.

FIG. 4 is a flowchart illustrating further examples of operations that may be performed to provide enhanced television services via an interactive trigger for setting a timer. Control may begin at S400 and continue to S402, where a selectable display object may be displayed with display of a video stream of a program. Next, at S404, a user selection of the interactive trigger may be received. As discussed above, this may involve the user pressing a particular button on a remote controller while a selectable object, such as an icon and/or text, is displayed.

Once the trigger has been selected, a determination may be made at S406 as to whether or not a timer for the program trigger is already set. This may involve determining whether any timer for the program has been set. If so, control may proceed to S408, where schedule program timers including the timer for the program of the trigger may be displayed. Alternatively, only the existing timer for the program of the trigger may be displayed. In either case, control may then jump to S424 where the process may end.

Alternatively at S406, the determination may be whether or not the exact timer of the trigger is already set, or whether or not a timer with certain matching parameters is already set. Thus, in the case where a timer is already set for the program, but doesn't sufficiently match the proposed timer based on the timer parameters of the trigger, the process may continue as if no timer for the program is already set. That, is, control may jump to S410, where a timer creation screen may be displayed. As discussed above, the timer creation screen may be the same as employed for setting timers via other processes, such as key word searching or manually scanning through the EPG.

At S412, user input to modify the timer parameter(s) may be received. Then, at S414, modifiable parameter(s) may be displayed. For example, in the case of multiple modifiable parameters, a limited number of modifiable parameters may be displayed as part of the timer creation screen. A remainder of the modifiable parameters may be displayed, for example, upon receiving user input selection "OPTIONS" to modify additional parameters. The division of modifiable parameters between the timer creation screen and the additional screen may be determined, for example, such that the most frequently modified parameters are part of the timer creation screen. Alternatively or additionally, the division may be determined such that more complex or advanced parameters are part of the additional screen.

For example, the timer creation screen may include modifiable parameters such as the type of timer and/or the frequency of the timer. Selection of "OPTIONS" to obtain the additional screen may provide access to alter the start time, the end time, and/or the maximum number of events to record (for recording timers), and/or to protect the timers, as discussed below.

Once the modifiable parameters are displayed, user input modifying the parameters and/or user input confirming the timer parameters may be received at S416. Once user confirmation id received, either at S416 or at S418, control may proceed to S420, where the client device may search the EPG information to find a match for the requested timer. As conventional EPGs may include, for example, nine days worth of programming information, there may be a high likelihood of finding a match. However, even if no match based on one or more of the timer parameters is found in the extended EPG, a timer based on the trigger may still be set. For example, a timer with only the program name or title may be set. Once set, the client device may periodically search the updated EPG for a match of the name or title.

Thus, whether or not a match is found at S420, the timer based on the trigger may be set. Then the scheduled program timer may be displayed. For example, the sole instance of the program to be recorded/tuned/reminded, only the first instance or a plurality of instances, may be displayed. Alternatively or additionally, one or more of the timer parameters may be displayed, for example, to provide additional information regarding how the timer is set. Next, after a predetermined amount of elapsed time and/or upon receipt of user input, the display may be discontinued and the process may end.

Figure 5A:
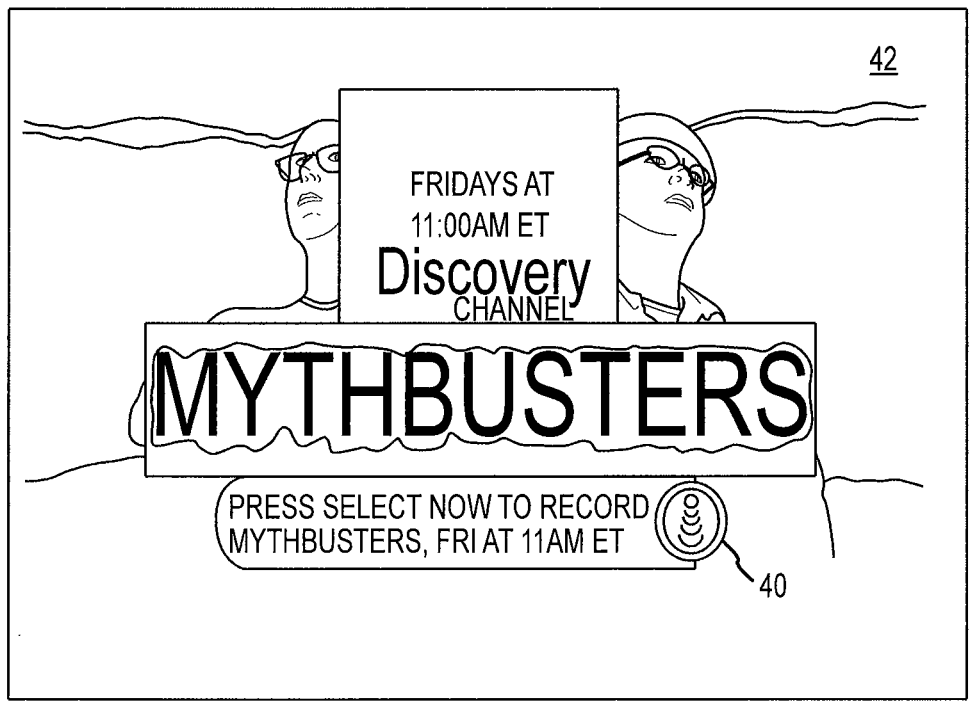
FIGS. 5A through 5F are screenshots illustrating examples of displays that may be provided to a user in accordance with the flowchart of FIG. 4.
Figure 5B:
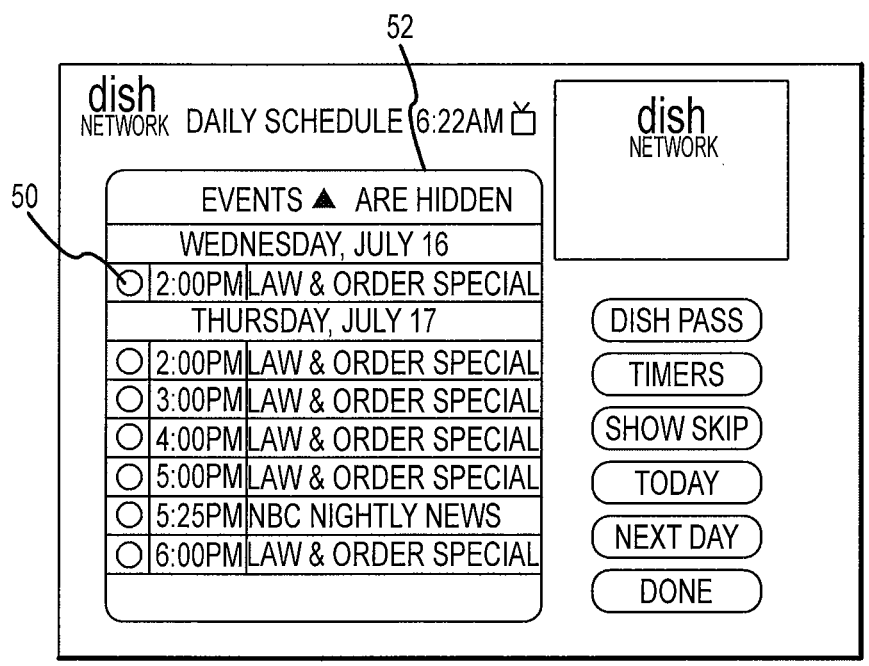

FIGS. 5A through 5F are screenshots illustrating examples of displays that may be provided to a user in accordance with the flowchart of FIG. 4. FIG. 5A illustrates a screenshot of a selectable display object 40 displayed with a video stream 42. FIG. 5B illustrates a screenshot of scheduled program timers 50, for example, as a daily schedule 52.

Figure 5C:
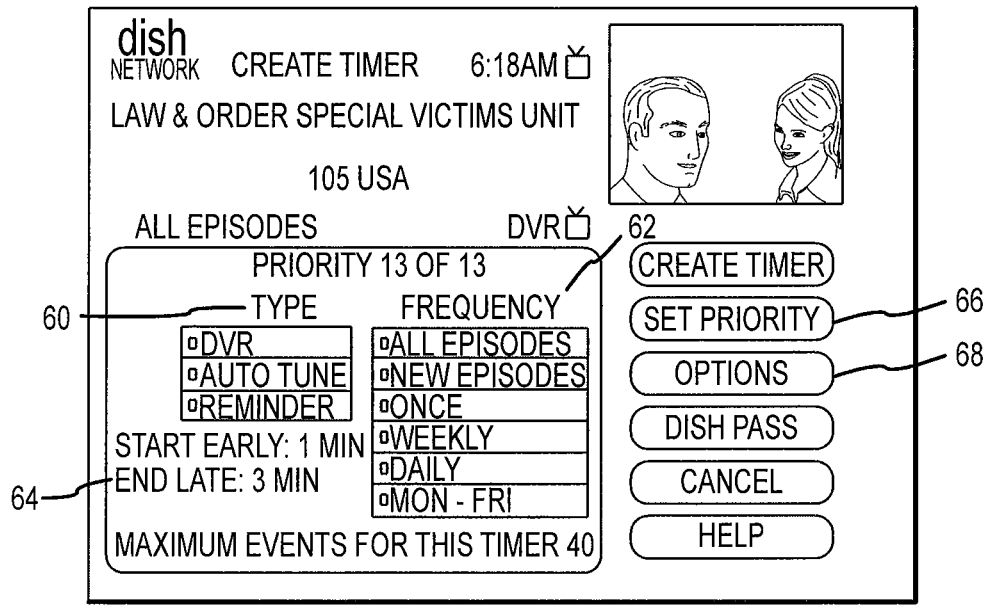

FIG. 5C illustrates a screenshot of a timer creation screen, including modifiable timer type 60, modifiable frequency 62 and non-modifiable start and stop times 64. Additional selectable display objects may be included, such as "SET PRIORITY" 66 to prioritize the timer relative to other timers with respect to available space and demand for that space, and "OPTIONS" 68 to obtain additional modifiable timer parameters, as discussed above with respect to FIG. 4.

Figure 5D:
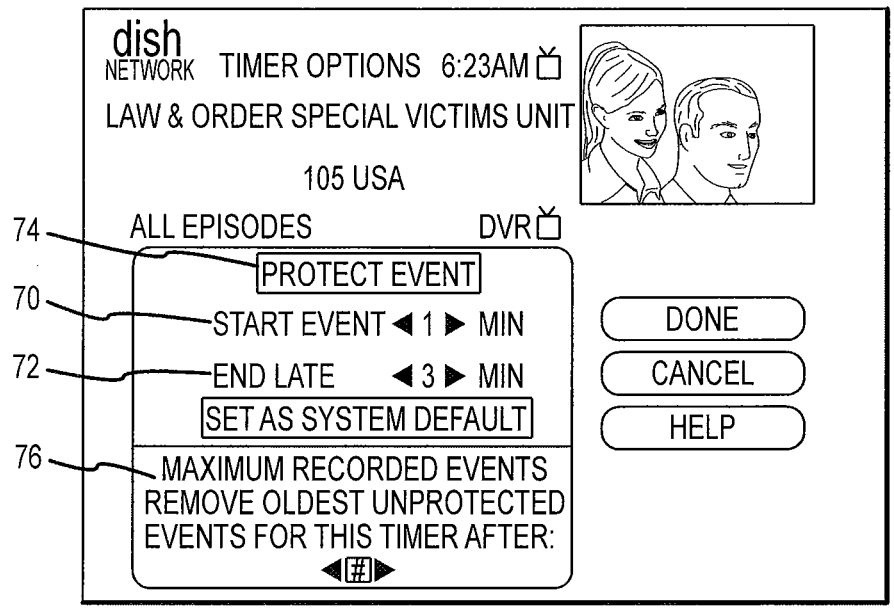

FIG. 5D illustrates a screenshot of a timer options screen, which may result from selection of "OPTIONS" in FIG. 5C. The timer options screen may include modifiable parameters that were previously non-modifiable, such as start time 70 and end time 72. The timer options screen may also include as additional modifiable parameters such as "PROTECT EVENT" 74 to prevent deletion of recorded event(s)/program(s) for a timer, "MAXIMUM RECORDED EVENTS" 76 to set how many of occurrences of the event/program to record before deleting unprotected events/programs.

Figure 5E:
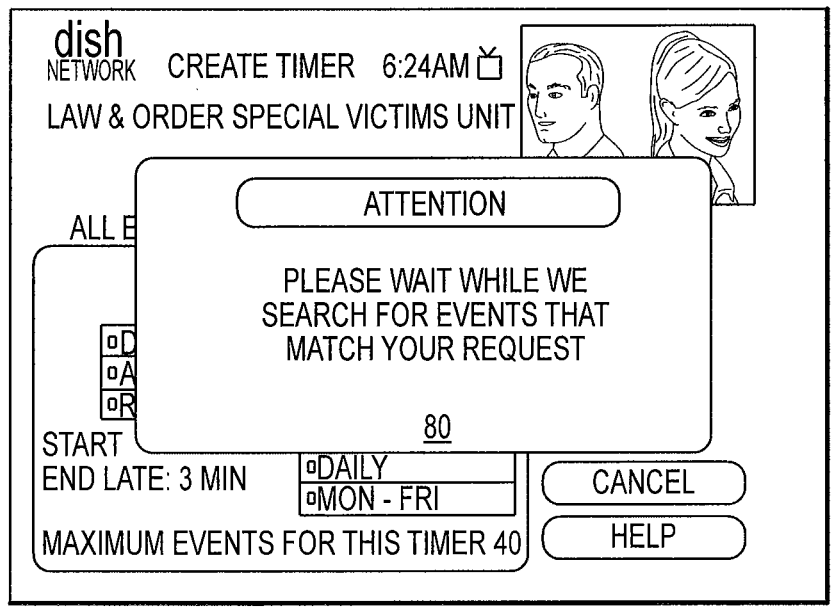
Figure 5F:
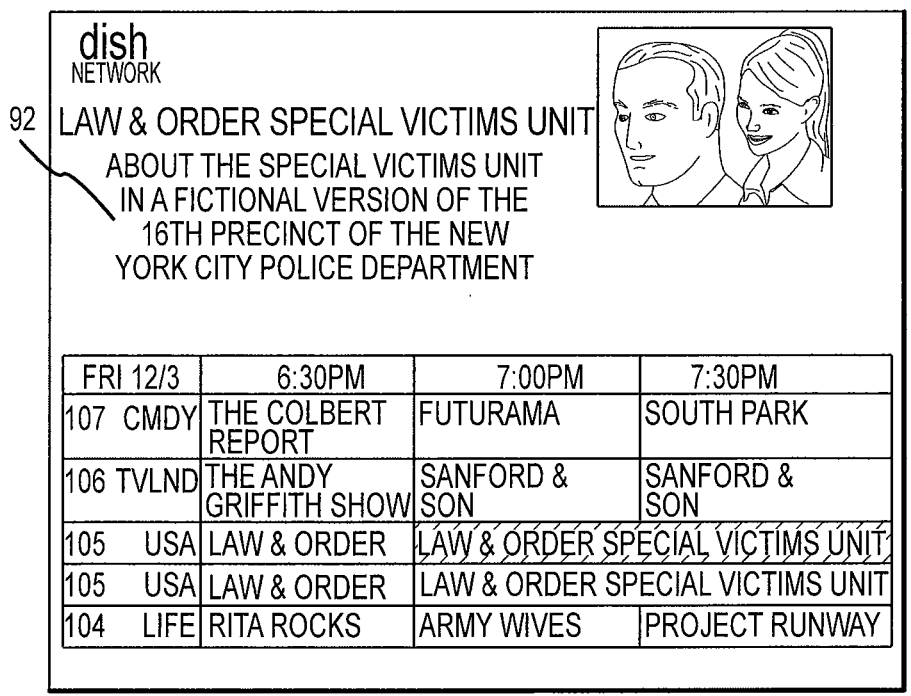

FIG. 5E illustrates a screenshot of an overlay 80 that may be provided while the client device searches for a match or matches of the timer. FIG. 5F illustrates a screenshot of an EPG 90 in which an event/program 92 to be recorded, for example, based on the timer is identified, such as by highlighting. Additional program information 94 may be provided, as well as any additional timer information, as appropriate or desired.

Figure 6A:
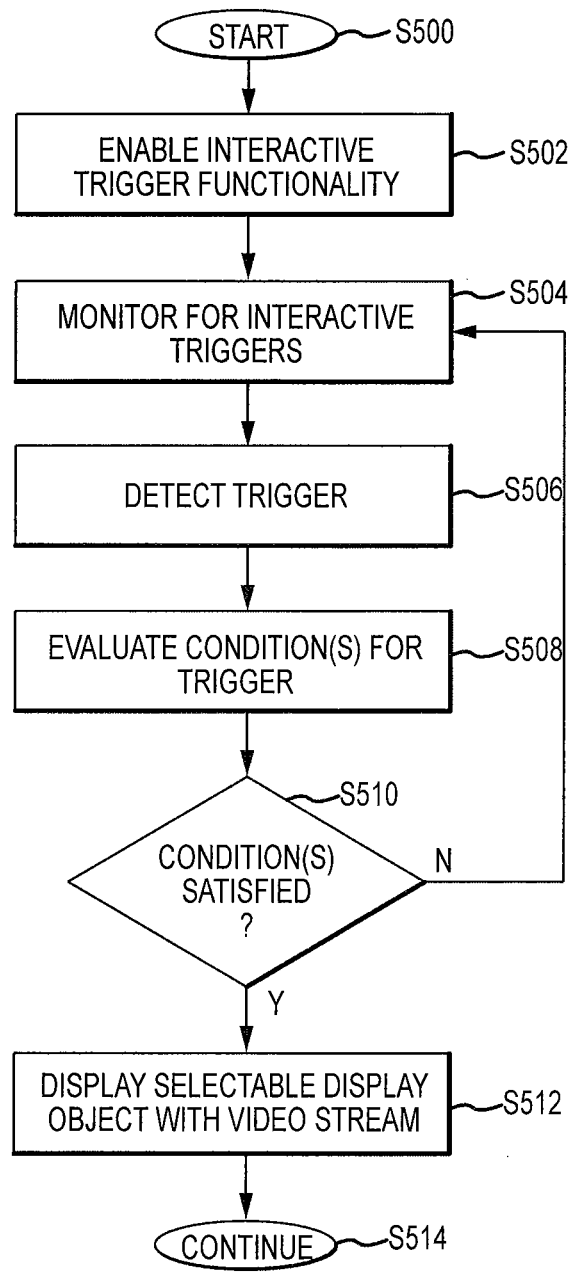
FIGS. 6A and 6B are flowcharts illustrating further examples of operations that may be performed to provide enhanced television services via an interactive trigger for setting a timer.
Figure 6B:
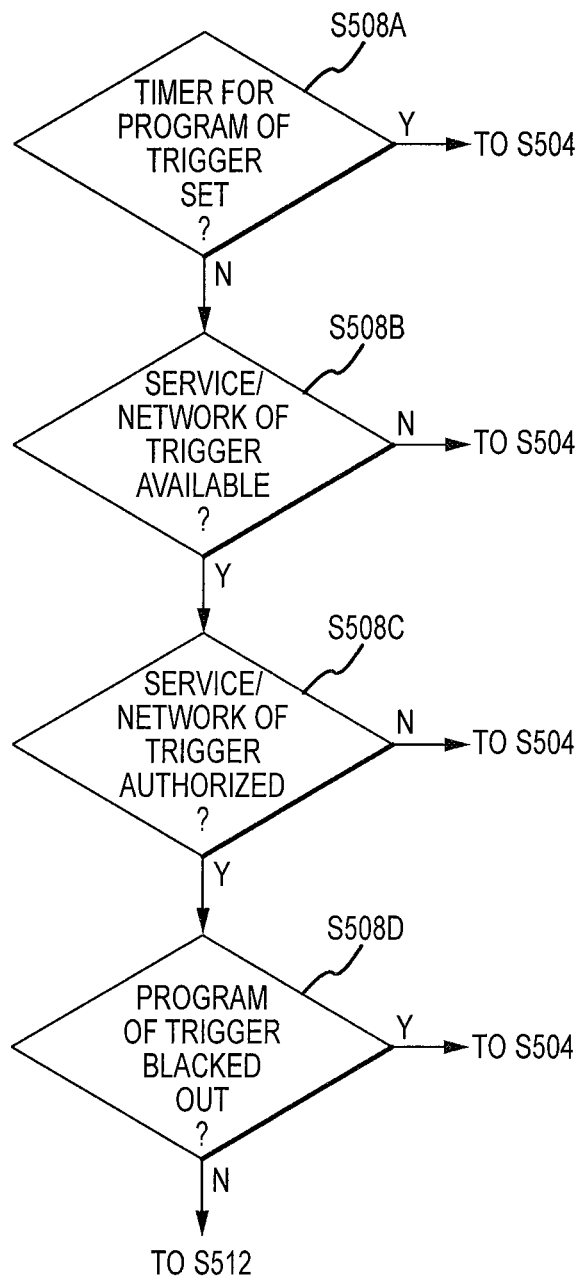

FIGS. 6A and 6B are flowcharts illustrating further examples of operations that may be performed to provide enhanced television services via an interactive trigger for setting a timer. Control may begin at S500 and continue to S502, where the interactive trigger functionality of the client device may be enabled. Although not shown, it should be understood that a user may disable the interactive trigger functionality of the client device as well. Once the functionality is enabled, at S504 the client device may monitor each video stream as it is to be output for display. When the client device detects an interactive trigger at S506, control may proceed to S508, where one or more conditions may be evaluated for the detected trigger. As discussed above, this may be based on the timer parameters and/or conditions that are part of the trigger. As part of the evaluation, a determination may be made at S510 whether or not each condition is satisfied. If not, the detected trigger may be ignored and not displayed, and control may return to S504 for continued monitoring. It should be understood, however, that multiple instances of the operations represented by S506 and thereafter. Thus, it should be understood that monitoring may be continuous, periodic and/or timed with expected trigger insertion point in the video stream, such that control proceeding to S506 does not interrupt the monitoring at S504.

If the condition(s) for the detected trigger is/are satisfied, then control may continue to S512, where a selectable display object may be displayed with the video stream, such as described herein. As represented at S514, the process may continue in a suitable fashion to facilitate the setting of a timer based on the trigger upon user selection, and so forth as discussed herein.

FIG. 6B illustrates examples of operations that may be performed as part of or in place of S508 and S510 in FIG. 6A. It should be understood that the conditions evaluated in FIG. 6B are only examples and are not exhaustive or limiting. As discussed above, once a trigger is detected, evaluation of conditions may occur. Beginning at S508A, the client device may determine whether or not a timer for the program of the trigger is already set. This may be executed according to various criteria, as discussed above for example. It should be understood that S508A may or may not be the first condition evaluation performed and that the order of evaluations may be arranged as appropriate or desired. Further, the evaluations of conditions may be performed serially as shown, or some or all of the evaluations may be performed concurrently, simultaneously or in parallel.

A second evaluation may be performed at S508B to determine whether or not the service or network referenced by the trigger is available to the client device. For example, in a satellite broadcast system, some channels may no be available based on the orientation of the receiving dish and the location of the particular satellite.

A third evaluation may be performed at S508C to determine whether or not the service or network referenced by the trigger is authorized for the client device. For example, a client device may not subscribe to a level of service that includes all available channels.

A fourth evaluation may be performed at S508D to determine whether or not the program referenced by the trigger is blacked out to the client device. For example, certain programs such as sporting events may be blacked out locally if the stadium/arena is not sold out for the event.

As illustrated in FIG. 6B, only when all of the conditions for the timer are satisfied will control proceed to S512. If any one of the conditions for the timer is not satisfied, the control may return to S504.

It should be understood that the satisfaction of a criterion may be determined as desired in some cases. For example, the determination made in S508C may send control to S504 when the service/network is authorized, and may be allowed to proceed with the display of the selectable display object at S514. In such case, the selection of the display object and/or the setting of the associated timer may be conditioned on the user agreeing to a trial period of the service/network. Other situations may be envisioned in which the present inability to set a timer of the trigger may not determine whether or not the selectable display object is to be displayed. For example, targeting of the interactive triggers may be performed based on the presence of a particular channel authorization, lack of a particular channel authorization, a blackout condition, a reverse blackout condition and/or model targeting.

Figure 7:
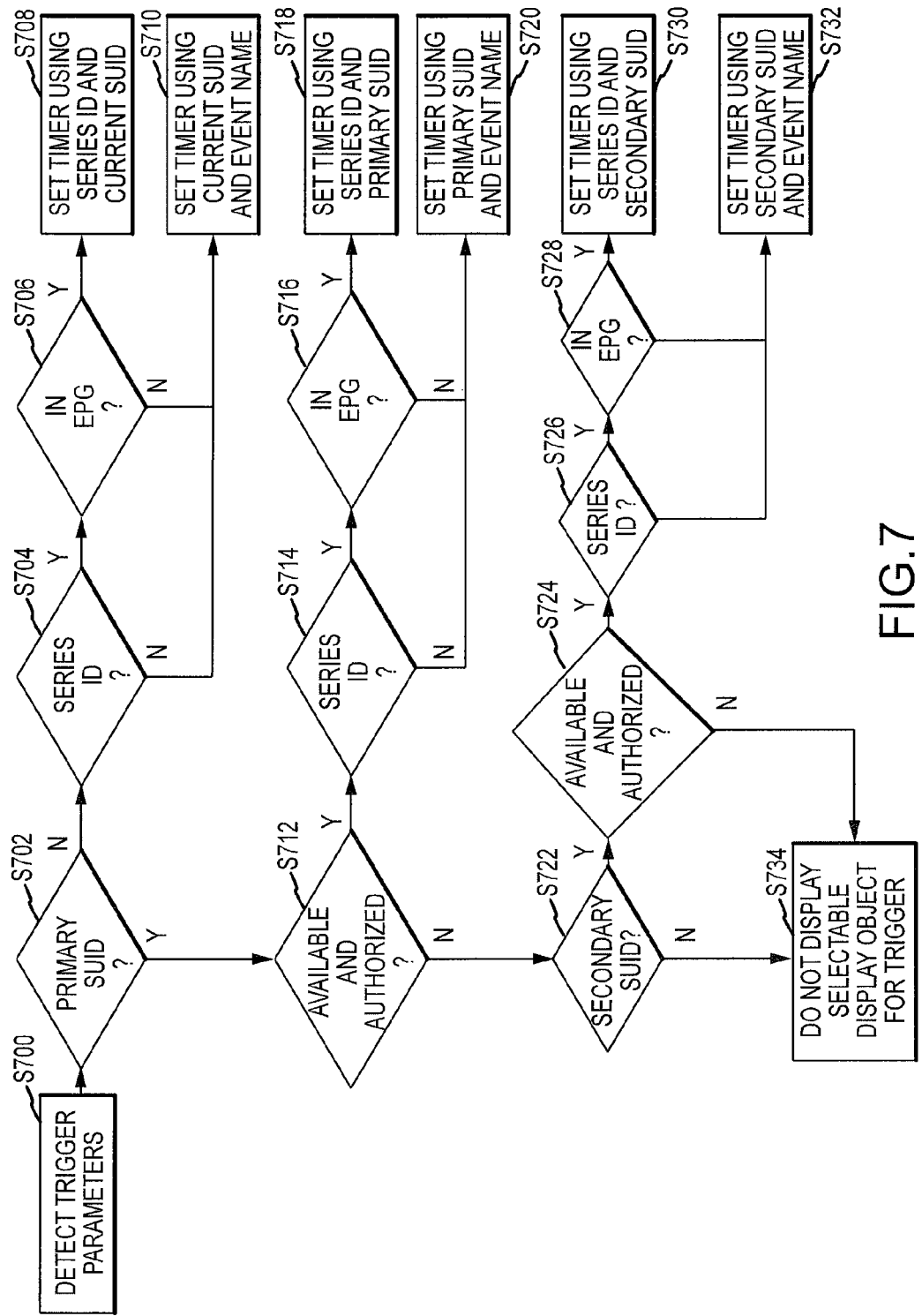
FIG. 7 is a flowchart illustrating further examples of operations that may be performed to provide enhanced television services via an interactive trigger for setting a timer.

FIG. 7 is a flowchart illustrating further examples of operations that may be performed to provide enhanced television services via an interactive trigger for setting a timer. In particular, the flowchart of FIG. 7 illustrates a possible logic flow based on the timer parameters defined by the interactive trigger. Thus, control may begin at S700, where the trigger and/or the trigger's timer parameters are detected. At S702, a determination may be made as to whether or not a primary service unique identification (SUID) is defined by a parameter of the trigger. If not, control may continue to S704, where a determination may be made as to whether or not a series identification (ID) is defined by a parameter of the trigger. If so, control may continue to S706, where a determination may be made as to whether or not the series ID is found in the EPG.

If so, control may continue to S708, where a timer may be set based on the trigger, using the series ID and the current SUID, that is, the SUID of the channel currently being displayed/viewed. If the series ID is not defined by a parameter of the trigger or if the series ID is not found in the EPG, for example, occurring farther in the future than the EPG reaches, then control may jump from S704 or S706, respectively, to S710. At S710, a timer may be set based on the trigger, using the event/program name provided by the trigger and the current SUID.

If the primary SUID is defined by a parameter of the trigger as determined at S702, control may jump to S712, where a determination may be made as to whether or not the primary SUID is available and authorized for the client device. If so, control may continue to S714, where a determination may be made as to whether or not the series ID is defined by a parameter of the trigger. If so, control may continue to S716, where a determination may be made as to whether or not the series ID is found in the EPG. If so, control may continue to S718, where a timer may be set based on the trigger, using the series ID and the primary SUID. If the series ID is not defined by a parameter of the trigger or if the series ID is not found in the EPG, then control may jump from S714 or S716, respectively, to S720. At S720, a timer may be set based on the trigger, using the event/program name provided by the trigger and the primary SUM.

If the primary SUID is not available or authorized as determined at S712, control may jump to S722, where a determination may be made as to whether or not a secondary SUID is defined by a parameter of the trigger. If so, control may continue to S724, where a determination may be made as to whether or not the secondary SUID is available and authorized for the client device. If so, control may continue to S726, where a determination may be made as to whether or not the series ID is defined by a parameter of the trigger. If so, control may continue to S728, where a determination may be made as to whether or not the series ID is found in the EPG. If so, control may continue to S730, where a timer may be set based on the trigger, using the series ID and the secondary SUID. If the series ID is not defined by a parameter of the trigger or if the series ID is not found in the EPG, then control may jump from S726 or S728, respectively, to S732. At S732, a timer may be set based on the trigger, using the event/program name provided by the trigger and the secondary SUID.

If the secondary SUID is not defined by a parameter of the trigger or if the secondary SUID is not available or authorized for the client device, then control may jump from S722 or S724, respectively, where the client device may ignore the detected trigger and/or not display the selectable display object for the trigger.

A further effect of the logic depicted in FIG. 7 may be on the frequency options that are available for the timer to be set. For example, the timers set at S710, S720 and S732 may only allow frequency options of "ALL" to apply the timer to all episodes of the event/program and "NEW" to apply the timer to only new or first-run episodes of the event program. For the timers set at S708, S718 and S730, if an episode identification (ID) is defined by a parameter of the trigger, all possible frequency options may be available for the timer to be set.

Although not depicted in the various flowcharts, additional features may be implemented in connection with the interactive triggers described herein. For example, when the selectable display object associated with the trigger is selected, the program currently being viewed may be paused (e.g., time shifted) to allow the user to return to the program where the user selected the object. Alternatively, the current program may not be paused. In such case, a conventional buffer feature may allow the user to rewind the current program if desired to view any content the user missed while setting the timer. Additionally, the current program may be displayed as a reduced portion of the screen, allowing the user to view and hear the current program while setting the timer.

Additionally, various embodiments contemplated for the systems and method disclosed herein may include a timer conflict resolution feature. Such a feature may operate in any suitable interactive manner that allows the user to promptly resolve any timer conflicts that will be created by setting the timer based on the trigger. Such a feature may be implemented by scanning existing timers prior to setting the time, for example, once the user has confirmed the timer parameters to be used for the timer, either by accepting the preset parameters of the trigger, or accepting after modifying one or more of such parameters.

In some embodiments, it may be beneficial to include model identification in the parameters of the interactive trigger. For example, the triggers may include one or more parameters that identify models of client devices that should implement the interactive triggers and/or models that should not. By limiting the implementation of the interactive triggers to particular models, models in which a glitch or other problem occurs may be excluded to avoid the problem and possible customer dissatisfaction. Such limiting may be temporary, for example, to allow software updates or other remedies to address the problem before further implementation of the interactive triggers.

Although not depicted in the Figures discussed above, it should be understood that interactive triggers disclosed herein may be configured to enable other types of timers to be set as well. For example, although video cassette recorders (VCRs) are somewhat technologically outdated, it is still possible to implement a VCR recording timer. Thus, it should be understood that the timers implemented based on the systems and methods disclosed herein may specify the recording device, such as a VCR, digital video recorder (DVR), recordable digital video disk (DVD), and the like. As such, the interactive triggers disclosed herein may include a parameter that specifies not only a recording timer, but a device-specific recording timer.

Other implementations may be envisioned based on the foregoing disclosure. For example, although the foregoing description is made in terms of interactive triggers that are added to a video stream, it should be understood that the interactive triggers may be provided external to the video stream as well. For example, the interactive triggers may be transmitted in parallel with the associated video stream, as a separate data stream. In such embodiments, the client device may monitor the separate data stream for the interactive triggers instead of the associated video stream.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of this disclosure.

What is claimed is:

1. A method for setting a timer via an interactive trigger, the method comprising:
receiving a video stream at a client device, the video stream including at least one interactive trigger configured to enable a timer to be set based on the interactive trigger;
detecting, utilizing at least one processing unit of the client device, the at least one interactive trigger;

transmitting at least one selectable display object with the video stream to a display device, the at least one selectable display object associated with the at least one interactive trigger;

receiving a selection of the selectable display object at the client device; and setting a timer for the client device based on the at least one interactive trigger in response to the received selection, wherein the at least one interactive trigger includes at least one timer parameter and said setting a timer for the client device based on the at least one interactive trigger in response to the received selection comprises:

receiving an input to modify the at least one timer parameter; and setting the timer with the modified at least one timer parameter, wherein the at least one timer parameter includes a unique program identification (UPID), and wherein the at least one interactive trigger includes a plurality of conditions and said transmitting at least one selectable display object with the video stream to a display device comprises:

evaluating each of the plurality of conditions, wherein said evaluating each of the plurality of conditions comprises:
 a) determining whether at least one selected from the group comprising a service or a network referenced by the at least one interactive trigger is available for the client device,
 b) determining whether the service or the network referenced by the at least one interactive trigger is authorized for the client device,
 c) determining whether a program referenced by the at least one interactive trigger is not blacked out for the client device, and
 d) determining whether the timer for the client device is not already set; and if each of the plurality of conditions are satisfied, transmitting the at least one selectable display object with the video stream to the display device.

2. The method of claim 1, further comprising:
displaying the at least one selectable display object with display of the video stream on the display device.

3. The method of claim 1, wherein the at least one interactive trigger includes at least one timer parameter and said setting a timer for the client device based on the at least one interactive trigger in response to the received selection comprises:
setting the timer with the at least one timer parameter.

4. The method of claim 3, wherein the timer includes at least one further timer parameter, wherein the at least one further timer parameter is selected from the group consisting of: a service unique identification, a program name, a program title, an event name, an event title, and a timer frequency.

5. The method of claim 1, further comprising:
performing at least one action utilizing the client device based on the set timer, the at least one action comprising at least one selected from the group comprising:
recording at least one program based on the set timer;
tuning the client device to a channel based on the set timer; and
transmitting a reminder including broadcast information regarding a particular program to the display device based on the set timer.

6. The method of claim 1, wherein the at least one interactive trigger includes at least one condition and said transmitting at least one selectable display object with the video stream to a display device comprises:
evaluating the at least one condition; and
if the at least one condition is satisfied, transmitting the at least one selectable display object with the video stream to the display device.

7. The method of claim 6, wherein said evaluating the at least one condition comprises:
determining whether at least one selected from the group comprising a service or a network referenced by the at least one interactive trigger is available for the client device, the service or the network referenced by the at least one interactive trigger is authorized for the client device, a program referenced by the at least one interactive trigger is not blacked out for the client device, and the timer for the client device is not already set.

8. The method of claim 1, wherein said detecting, utilizing at least one processing unit of the client device, the at least one interactive trigger comprises:
monitoring content stored on the client device during playback.

9. The method of claim 1, further comprising inserting the interactive trigger into a blanking interval of the video stream.

10. The method of claim 1, wherein the timer is one selected from the group consisting of: a recording timer, and auto-tune timer, and a reminder timer.

11. The method of claim 1, wherein the interactive trigger corresponds to a first program and the video stream comprises an advertisement for the first program.

12. A client device for setting a timer via an interactive trigger, the client device comprising:
at least one input component that receives a video stream including at least one interactive trigger, the at least one interactive trigger configured to enable a timer to be set based on the interactive trigger; and
at least one processor, communicably coupled to the at least one input component, that detects the at least one interactive trigger and is configured to transmit at least one selectable object with the video stream to a display device, the at least one selectable display object associated with the at least one interactive trigger,
wherein the at least one interactive trigger includes a plurality of conditions and said at least one processor:
evaluates each of the plurality of conditions,
wherein said evaluating each of the plurality of conditions comprises:
 a) determining whether at least one selected from the group comprising a service or a network referenced by the at least one interactive trigger is available for the client device,
 b) determining whether the service or the network referenced by the at least one interactive trigger is authorized for the client device,
 c) determining whether a program referenced by the at least one interactive trigger is not blacked out for the client device, and
 d) determining whether the timer for the client device is not already set; and
if each of the plurality of conditions are satisfied, the at least one processor transmits the at least one selectable display object with the video stream to the display device,
wherein the at least one processor sets the timer based on the interactive trigger in response to receiving a selection of the selectable display object,
wherein the at least one user interface component is operable to receive a modification to at least one parameter of the timer and the at least one processor sets the timer with the modified at least one parameter.

13. The client device of claim 12, further comprising:
at least one user interface component, communicably coupled to the at least one processor, that is operable to transmit the at least one selectable object with the video stream to the display device and receive the selection of the selectable display object.

14. The client device of claim 12, further comprising:
at least one storage media;
wherein the at least one processor is operable to recording at least one program to the storage media based on the set timer.

15. The client device of claim 12, wherein the timer is a recurring timer.

16. The client device of claim 12, wherein the client device is at least one selected from the group comprising a television receiver device, a set top box device, a satellite receiver device, and a digital video recorder device.

* * * * *